United States Patent
Silveira E Silva et al.

(10) Patent No.: US 10,941,885 B2
(45) Date of Patent: Mar. 9, 2021

(54) PROCESS FOR PRODUCING A MULTILAYER PIPE HAVING A METALLURGICAL BOND BY DRAWING, AND MULTILAYER PIPE PRODUCED BY THIS PROCESS

(71) Applicant: VALLOUREC SOLUÇÕES TUBULARES DO BRASIL S.A., Jaceaba (BR)

(72) Inventors: Julio Marcio Silveira E Silva, Belo Horizonte (BR); Timo Ebeling, Belo Horizonte (BR); Hezick Da Silva Perdigao, Belo Horizonte (BR); Danielle Granha Giorgini, Belo Horizonte (BR); Antonio Wagner Da Silva Penna, Contagem (BR)

(73) Assignee: VALLOUREC SOLUÇÕES TUBULARES DO BRASIL S.A., Jaceaba MG (BR)

( * ) Notice: Subject to any disclaimer, the term of this patent is extended or adjusted under 35 U.S.C. 154(b) by 0 days.

(21) Appl. No.: 15/030,572

(22) PCT Filed: Jul. 23, 2014

(86) PCT No.: PCT/BR2014/000249
§ 371 (c)(1),
(2) Date: Apr. 19, 2016

(87) PCT Pub. No.: WO2014/169366
PCT Pub. Date: Oct. 23, 2014

(65) Prior Publication Data
US 2016/0273683 A1    Sep. 22, 2016

(30) Foreign Application Priority Data
Aug. 23, 2013   (BR) .................. 10 2013 021664 0

(51) Int. Cl.
*B21C 37/15*    (2006.01)
*B21C 37/06*    (2006.01)
(Continued)

(52) U.S. Cl.
CPC .................. *F16L 9/02* (2013.01); *B21C 1/24* (2013.01); *B21C 37/154* (2013.01); *F16L 58/08* (2013.01); *B21C 9/00* (2013.01); *B21C 37/06* (2013.01)

(58) Field of Classification Search
CPC ......... F16L 9/02; F16L 58/08; F16L 9/16–22; B21C 1/24; B21C 37/154; B21C 37/06; (Continued)

(56) References Cited

U.S. PATENT DOCUMENTS 3,598,156 A * 8/1971 Ulmer ...................... F16L 9/02
                                                       138/140
4,162,758 A * 7/1979 Mikarai ................ B21C 37/154
                                                       228/131
(Continued)

FOREIGN PATENT DOCUMENTS

JP    H02 187280 A    7/1990
JP    H08 90258 A     4/1996
WO    WO 2009/047688 A2    4/2009

OTHER PUBLICATIONS

International Search Report prepared by the European Patent Office dated Oct. 9, 2014, for International Application No. PCT/BR2014/000249.
(Continued)

*Primary Examiner* — Lawrence Averick
(74) *Attorney, Agent, or Firm* — Sheridan Ross P.C.

(57) ABSTRACT

The invention relates to a process for producing a multilayer pipe (1) from a tubular element having a metallurgical bond comprising at least one outer pipe (10) of metallic material
(Continued)

and one inner pipe (20) of metallic material arranged within the outer pipe, the inner surface of the outer pipe (10) being mechanically bonded to the outer surface of the inner pipe (20) at least in parts of their interface, in which, in a production line, the tubular element is simultaneously heated and drawn, wherein each portion of the tubular element is submitted to heating by induction and then to hot-drawing, wherein the tubular element is drawn with a mandrel located therein. Through this process, the existing mechanical connection between the pipes is trans-formed in a metallurgical connection. The invention also relates to a multilayer pipe (1) produced for this process, wherein the outer pipe (10) is made of a carbon manganese steel alloy and the inner pipe (2) is made of a corrosion-resistant alloy.

9 Claims, 5 Drawing Sheets

(51) Int. Cl.
  *B21C 9/00* (2006.01)
  *F16L 9/02* (2006.01)
  *B21C 1/24* (2006.01)
  *F16L 58/08* (2006.01)
(58) Field of Classification Search
  CPC .... B21C 9/00; B21C 3/16; B21C 3/14; B21C 45/00; B21D 5/00; B21D 39/02
  See application file for complete search history.

(56) References Cited

U.S. PATENT DOCUMENTS

| | | | | | |
|---|---|---|---|---|---|
| 4,367,838 | A | * | 1/1983 | Yoshida | B23K 20/129 228/114.5 |
| 4,598,857 | A | * | 7/1986 | Matsui | B23K 20/001 156/86 |
| 4,795,078 | A | * | 1/1989 | Kuroki | B21C 37/06 228/131 |
| 5,056,209 | A | * | 10/1991 | Ohashi | B21C 23/22 29/517 |
| 5,097,585 | A | * | 3/1992 | Klemm | B21C 37/154 138/140 |
| 5,259,547 | A | * | 11/1993 | Hardwick | B23K 20/085 228/107 |
| 5,406,055 | A | * | 4/1995 | McGaffigan | B29C 35/0272 156/143 |
| 5,517,540 | A | * | 5/1996 | Marlowe | C22F 1/186 376/409 |
| 5,558,150 | A | * | 9/1996 | Sponseller | B22D 13/02 164/114 |
| 5,657,659 | A | * | 8/1997 | Yamada | B21B 17/04 72/208 |
| 5,988,484 | A | * | 11/1999 | Osborn | B21C 23/22 228/126 |
| 6,009,912 | A | * | 1/2000 | Andre | B21C 37/122 138/122 |
| 8,226,327 | B2 | * | 7/2012 | Endal | B63B 35/03 405/154.1 |
| 8,414,715 | B2 | * | 4/2013 | Altschuler | C21D 1/25 148/519 |
| 2004/0069040 | A1 | * | 4/2004 | Nakazato | B21D 9/073 72/368 |
| 2005/0208324 | A1 | * | 9/2005 | Oishi | B21C 1/003 428/654 |
| 2006/0037660 | A1 | * | 2/2006 | Kinnally | B21C 1/00 138/143 |
| 2006/0213566 | A1 | * | 9/2006 | Johnson | F16L 9/18 138/111 |
| 2007/0132228 | A1 | * | 6/2007 | Montague | B21C 37/154 285/123.15 |
| 2009/0025815 | A1 | * | 1/2009 | Becks | F16L 9/18 138/112 |
| 2010/0034590 | A1 | * | 2/2010 | Endal | B63B 35/03 405/166 |
| 2011/0017339 | A1 | * | 1/2011 | Chakravarti | B21C 37/154 138/143 |
| 2011/0017807 | A1 | * | 1/2011 | Chakravarti | B21C 37/154 228/127 |
| 2011/0146366 | A1 | * | 6/2011 | Berg | B21C 37/08 72/368 |
| 2013/0205861 | A1 | * | 8/2013 | Hanada | B21C 1/22 72/274 |
| 2013/0312865 | A1 | * | 11/2013 | Baur | F16L 7/00 138/148 |
| 2014/0299236 | A1 | * | 10/2014 | Anelli | C21D 8/105 148/504 |
| 2016/0207086 | A1 | * | 7/2016 | Silveira E Silva | F16L 58/00 |
| 2016/0273683 | A1 | * | 9/2016 | Silveira E Silva | B21C 37/154 |
| 2017/0246670 | A1 | * | 8/2017 | Jang | B21C 37/06 |

OTHER PUBLICATIONS

Written Opinion prepared by the European Patent Office dated Oct. 9, 2014, for International Application No. PCT/BR2014/000249.
International Preliminary Report on Patentability for International (PCT) Patent Application No. PCT/BR2014/000249, dated Feb. 23, 2016, 7 pages.

* cited by examiner

PROCESS FOR PRODUCING A MULTILAYER PIPE HAVING A METALLURGICAL BOND BY DRAWING, AND MULTILAYER PIPE PRODUCED BY THIS PROCESS

CROSS REFERENCE TO RELATED APPLICATIONS

This application is a national stage application under 35 U.S.C. 371 and claims the benefit of PCT Application No. PCT/BR2014/000249 having an international filing date of Jul. 23, 2014, which designated the United States, which PCT application claimed the benefit of Brazilian Patent Application No. BR 10 2013 021664 0 filed Aug. 23 2013, the disclosures of which are incorporated herein by reference.

The present invention relates to a process for producing a multilayer pipe having a metallurgical bond from at least one inner pipe and one outer pipe by means of at least one hot mechanical forming step. The pipes produced by this method typically have a corrosion-resistant layer, which enables their use in highly corrosive environments and a pipe with a high mechanical strength.

DESCRIPTION OF THE PRIOR ART

Multilayer pipes, such as pipes having a metallurgical bond (also known as "clad pipes") and pipes having a mechanical bond (also known as "lined pipes"), as well as their processes of manufacturing are object of current industrial development, said coated pipes being mainly used in the oil industry wherein there may be strong mechanical stress and highly corrosive environments. The internally circulating fluid may promote a chemical attack to the pipe, requiring the use of corrosion-resistant alloys.

According to the definition provided in the standards DNV-OS-F101 and API 5LD, a clad pipe consists of an outer pipe having a corrosion-resistant inner layer, where the bond between these materials is metallurgical. According to the definition provided in the standards DNV OS F101 and API 5LD, a lined pipe consists of an outer pipe having a corrosion-resistant inner layer, where the bond between these materials is mechanical.

The prior art contains several processes for manufacturing clad pipes, generally including a material preparation step, an optional layer step and a cladding step. Two well-known processes used in industrial scale for large production batches are cladding by rolling and overlay welding.

In the cladding process by sheet rolling, the sheet rolling of two different materials is made simultaneously, said process originating one single clad sheet. This sheet is then treated, formed and welded longitudinally originating the seam clad pipe.

In the cladding process by overlay welding, the materials are joined by deposition of fillet welds throughout the inner pipe surface. The material used in the fillet weld is normally a corrosion-resistant alloy. The weld deposition process enables a metallurgical bond between the inner and outer materials of the clad pipe.

Document GB2085330 discloses a method of producing clad pipes comprising a first cold-drawing to obtain good mechanical bonding between an inner pipe and an outer pipe. Then, the intermediate product undergoes a heating step in a furnace, where the two pipes are bond together. Subsequently, the intermediate product is subjected to a hot working step for shaping the final product by pressing or rolling. In this document, the manufacturing process of clad pipes further comprises a step of preparing surfaces that come into contact in cold drawing. This step consists of the cleaning of surfaces that come into contact through polishing. Alternatively, this step may comprise shot blasting of the surfaces that come into contact, instead of polishing.

Also according to document GB2085330, where the difference in the thermal expansion coefficient between the inner and outer pipes is large, the bonded pipe ends are welded to prevent intrusion of air between the materials that form the bonded pipe, as the air intrusion may affect the quality of the pipes. Normally, a final step of rolling is also required, after cold and hot forming.

Document U.S. Pat. No. 3,598,156 discloses a method of producing a bimetal tubing having a joint metal, which carries out the metallurgical bonding between an inner pipe and an outer pipe. In the process described in said document, cold expansion of the inner pipe is performed with a tapered mandrel, ensuring a strong bond between the three metal layers. Then, the pipe is heated by an electromagnetic induction coil, causing the inner pipe with a higher coefficient of expansion to expand more than the outer pipe, exerting great pressure on the joint intermediate layer. This joint layer melts, without melting the inner and outer pipes, and subsequently it solidifies again, leading to the metallurgical bond between inner and outer pipes. The document does not suggest a subsequent hot drawing step.

Moreover, this document also discloses that, before cold drawing, a step of chemical treatment and/or polishing of the outer surface of the inner pipe and of the inner surface of the outer pipe is carried out. However, it does not suggest blasting of these surfaces to increase the surface roughness and the contact force. As it is a clad pipe, that is, two pipes metallurgically bond together, it is not necessary to increase the surface roughness and the mechanical strength of the bond between the pipes, which would be important to lined pipes. However, an improvement of the clad product with this treatment may also be obtained.

The processes of cladding concentric pipes presented in the prior art always comprise preparatory steps, a step of forming or depositing weld material, which step results in a metallurgical bond between the pipes, and a finishing step, which is generally a step between lamination, pressing, rolling, extrusion or codrawing.

None of the prior art processes discloses the production of clad pipes in only one forming step, without a finishing step. In addition, none of the processes of the prior art presents the possibility of implementing all stages on a single production line without needing to move the pipe from one bench to the another between steps or moving the heated pipes from inside the furnace to the production line, which burdens the process and the speed of production and labor. None of the prior art documents discloses a seamless multilayer pipe having a metallurgical bonding.

BRIEF DESCRIPTION OF THE INVENTION

The objects of the invention are achieved by a process for producing a multilayer pipe having a metallurgical bond from a tubular element comprising at least one other pipe of metallic material and one inner pipe of metallic material arranged inside the outer pipe, the inner surface of the outer pipe being mechanically bonded to the outer surface of the inner pipe, the process comprising the following steps:

In a production line, the tubular element is simultaneously heated and drawn, wherein each portion of the tubular element is subjected to heating by induction and then to hot drawing, and wherein the tubular element is drawn with a mandrel located inside it.

The outer pipe consists of a carbon manganese steel alloy and the inner pipe consists of a corrosion-resistant alloy.

Preferably, each section of the tubular element is heated at a temperature of at least 900° C. when crossing an electromagnetic coil, arranged in the production line. Also preferably, in the steps of heating and drawing, the tubular element is pulled through the inside of at least one electromagnetic coil, where it is heated to a temperature between 950° and 1050° C. and a drawing die arranged sequentially in the output the electromagnetic coil with the mandrel positioned within the tubular in alignment with a drawing die opening. The drawing step may comprise decreasing the wall thickness of the tubular element by compression of the tubular element between the drawing die and the mandrel.

The process may further comprise, after the drawing step, at least one thermal treatment step wherein the tubular element is subjected to cooling. A step of cold drawing with optional previous lubrication of the inner surface of the inner pipe and the outer surface of the outer pipe can also be carried out in order to improve the geometric tolerance and the surface finish. Furthermore, an additional step of bending of the tubular element after drawing can be carried out.

The objects of the invention are achieved by a multilayer pipe having a met allurgical bond produced by the process described herein, the multilayer pipe comprising at least one outer pipe of metallic material and one inner pipe of metallic material arranged inside the outer pipe, the inner surface of the outer pipe being metallurgically bonded to the outer surface of the inner pipe, the outer pipe being composed by a carbon manganese steel and the inner pipe consisting of a corrosion-resistant alloy.

The inner pipe of metallic material may be made of a material comprising at least one of carbon steel, low alloy steel, high alloy steel, stainless steel, nickel base alloy, titanium base alloy, cobalt base alloy, copper base alloy, tin base alloy and zirconium base alloy. The outer and inner pipes are preferably seamless pipes.

The multilayer pipe may comprise at least one intermediate layer of metallic material arranged between the outer and inner pipes, the intermediate layer of metallic material. The intermediate layer may have a melting point lower than the melting points of the outer and inner pipes. The intermediate layer may comprise nickel (Ni) or zirconium (Zn). The multilayer pipe may comprise an additional outer layer externally arranged to the outer pipe, the outer layer being made of a second outer pipe having an inner diameter larger than the outer diameter of the outer pipe and being metallurgically bonded to the outer pipe. The outer layer is preferably formed of a corrosion-resistant alloy, abrasion-resistant alloy and fatigue-resistant alloy. In the multilayer pipe, there may be up to 100% metallurgical bond between the outer pipe and the inner pipe.

BRIEF DESCRIPTION OF THE DRAWINGS

The present invention will be further described in more details based on one example of execution represented in the drawings. The figures show.

DETAILED DESCRIPTION OF THE DRAWINGS

Figure 1:
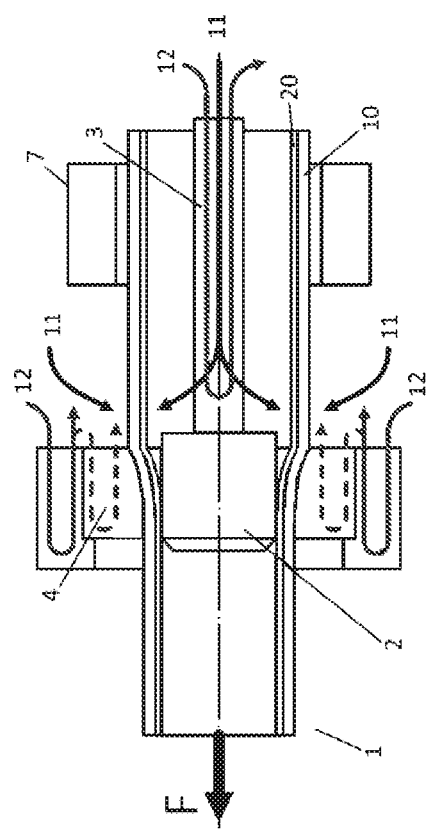
FIG. 1—a schematic view of a first embodiment of the hot drawing step of the process for producing a multilayer pipe of the present invention.

As may be seen in FIGS. 1 to 5, the present invention relates to a process for producing a multilayer pipe having a metallurgical bond 1 from a tubular element comprising at least one outer pipe of metallic material 10 and one inner pipe of metallic material 20, such that the pipe produced by the process is a multilayer pipe comprising at least one outer layer made of the outer pipe 10 being at least partially metallurgically bonded to the inner layer made of the inner pipe 20. The tubular element may alternatively comprise initially more than two pipes, generating one pipe 1 with multiple layers being at least partially metallurgically bonded to each other.

The multilayer pipe produced by this process may be a clad pipe, when the bonding between the layers forming the multiplayer pipe produced with the process of the present invention meets the minimum requirements of norms ASTM A578 and API 5LD, that is, any non-clad area on the surface of the pipe may not exceed a diameter of 25 mm inside a scanned area of a 225 by 225 mm square centered on an indication of a discontinuity. Moreover, the pipe should not have any non-clad area within a distance of 100 mm from the pipe end. According to the present invention, the clad pipe may be manufactured by the process according to the invention with up to 100% cladding between the outer pipe 10 and the inner pipe 20.

The pipes that constitute the tubular element are preferably seamless pipes. In this case, the multilayer pipe produced by the process according to the invention is also seamless. In alternative embodiments of the invention, the outer pipe 10 may be a seamless pipe, and the inner pipe 20 may be a welded seam pipe.

The inner pipe 20 is preferably made of a corrosion-resistant alloy (CRA) and is initially arranged within the outer pipe 10, forming a kind of coating for the latter. The inner pipe may also be made of abrasion-resistant alloys (WRA), or to fatigue-resistant alloys. Typically, the outer pipe 10 is responsible for providing mechanical strength to the final multilayer pipe. It is also important that the inner surface of the outer pipe 10 is mechanically bonded to the outer surface of the inner pipe 20 so that there is no oxygen between the two pipes. The presence of oxygen at the interface between the pipes can cause the production of oxides which generate corrosion and could prevent good cladding between the pipes. The tubular element comprising pipes mechanically bonded together can be called a lined pipe.

The formation of the mechanical bond between the pipes can be made by any method in the art, such as mechanical forming steps by mechanical expansion, extrusion, cold drawing, rolling, among others. Preferably, before the mechanical bond forming step between the pipes, a blasting step is performed on the inner surface of the outer pipe 10 and on the outer surface of the inner pipe 20, which will be mechanically bonded together. These surfaces are preferably blasted with steel shots in order to increase their roughness and optimize the contact force between the materials, thus improving the mechanical bonding between the pipes. The use of steel shots in blasting is advantageous because as the shots are made of steel, they do not contribute to the increase of impurities on the surface of the pipe.

Figure 2:
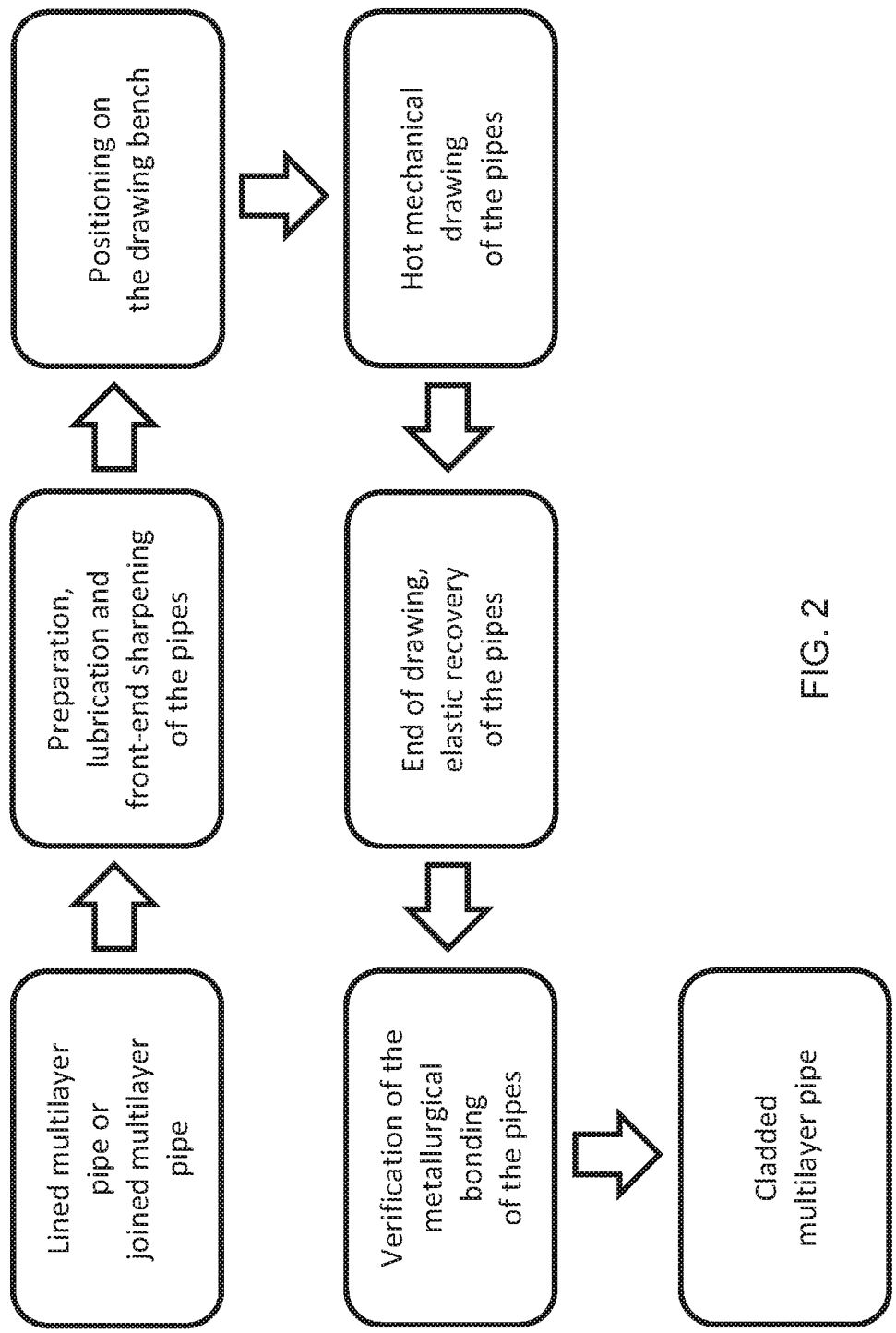
FIG. 2—a block diagram of steps according to the present invention.
Figure 3:
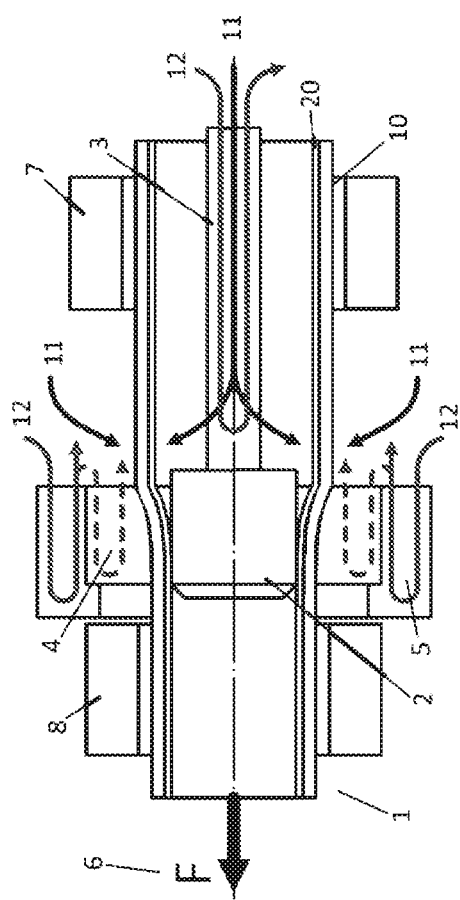
FIG. 3—a schematic view of a second embodiment of the hot drawing step of the process for producing a multilayer pipe of the present invention.
Figure 4:
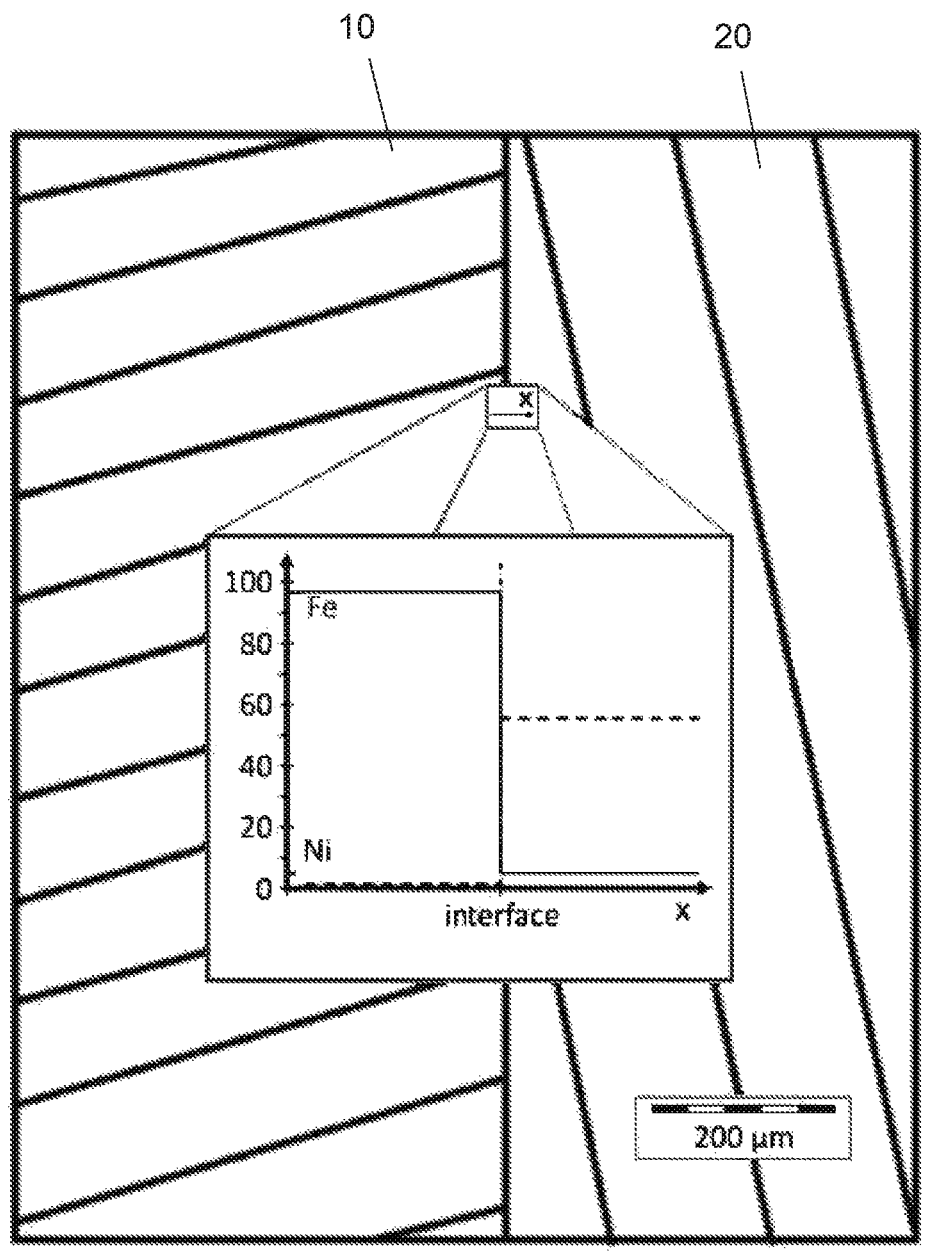
FIG. 4—picture of the interface between the mechanically bonded pipes, produced by the process of the present invention, associated with a diagram of the concentration of the iron and nickel elements in the interface between the pipes.

The mechanical bond between the outer pipe 10 and the inner pipe 20 constituting the lined pipe 1 according to an example of the product of the invention can be seen in FIG. 4. This figure contains an (unetched) cross-section microscopic picture of the interface of the junction between the pipes, wherein the outer pipe 10 is shown on the left side in a darker shade of gray and the inner pipe 20 is shown on the right side in a lighter shade of gray. The interface between the pipes in a section corresponding to the upper smaller box is represented in terms of the concentration of the materials of both pipes in the diagram below it. This diagram is an enlarged version of said interface section, in which the ordinate axis represents the concentration of each element in mass percent and the abscissa represents the position in the lined pipe in the direction perpendicular to the interface. The diagram shows the concentration of the elements iron (Fe) and nickel (Ni) in the X direction in the interface region between the pipes in the lined pipe. The solid line represents the concentration of Iron which, according to one embodiment of the invention, is one of the main constituents of the outer pipe 10. The dashed line represents the concentration of Nickel in this interface region, wherein Nickel is a major element of the inner pipe 20 according to this embodiment of the invention. The abrupt change of the concentration of iron and nickel occurs in the same position of the graph representing the interface region between the pipes. This means that there was no remarkable diffusion between the materials of the two pipes, so that there is only a mechanical bond between them, with no metallurgical bond, that is, no cladding. FIG. 2 shows a flowchart of a preferred embodiment of the process according to the invention. After the mechanical bonding of the pipes and before the hot drawing, the process of the invention preferably comprises a step of lubrication of the inner surface of the inner pipe 20, which will contact the mandrel 2 and the outer surface of the outer pipe 10, which will contact the drawing die 4 during the hot-drawing step. This lubrication may also be performed during the drawing step. The circulation of the lubricant 11 is shown in FIGS. 1 and 3. Lubrication is effected in order to reduce the friction resulting from contact of the tubular element with the drawing die and with the mandrel. The lubricant 11 used is preferably based on a mixture of water and graphite, or any lubricant for high-temperature processes, like the hex-α-BN. This lubricant has the advantage that it does not modify the surface chemical composition of the pipes.

In the process according to the invention, so that a metallurgical bond is formed between the outer pipe 10 and the inner pipe 20, at least one hot-drawing step 22 is carried out, and the steps of heating and drawing the pipe are carried out simultaneously in the same production line. Thus, each portion of the tubular element is subjected, in the same production line, to an induction heating, and subsequently to a hot-drawing. The drawing takes place with the aid of a mandrel 22 located inside the tubular element.

The hot drawing step is preferably performed 1 to 5 times, at a speed varying from 0.1-5.0 m/min and at a temperature varying from 800-1300° C.

Since the drawing die opening 4 has a smaller diameter than the tubular element to be pulled through it, before drawing, the tubular element is preferably subjected to a step of pointing, wherein the pipe end is shaped in order to have its outer diameter reduced, so that it can be initially pulled through the drawing die opening 4. In a preferred embodiment of the invention, the tip of the tubular element is heated in the line or in a furnace and then is shaped to assume the diameter and size required for its traction through the drawing die. Pointing may also be made by cold forging.

In the heating step for performing hot-drawing, the tubular element is pulled through the inside of at least one electromagnetic coil 7 arranged in the production line, so that each pipe section, when crossing the coil, is heated by induction through the Joule Effect, reaching a minimum temperature of 900° C. at the outlet of the coil, and preferably in the range of 950° C. to 1050° C., depending on the geometry of the pipe, the length to be produced, the materials used, the reduction applied, among others.

Then the hot tubular element is pulled through drawing die 4 arranged sequentially in the output the electromagnetic coil 7 in the same production line. When the tubular element crosses the drawing die 4, the mandrel 2 is arranged inside the tubular element in alignment with a drawing die opening 4.

In the drawing step, the wall thickness of the tubular element may be decreased by compression of the tubular element between the drawing die 4 and the mandrel 2. This compression parameter of the tubular element and the thickness of the final pipe may be adjusted in function of the final product to be obtained. If necessary, in the process according to the invention, more than one cold- or hot-drawing step may be performed, so that the pipe reaches the desired dimensions.

In a preferred embodiment of the invention, the hot-drawing step is performed on a drawing bench shown in FIG. 1, in which the end of the tubular element is pulled by a car in the direction of arrow F shown in FIG. 1, causing the tubular element to pass through the electromagnetic coil 7 and the drawing die 4, with a mandrel 2 secured to a connecting rod 3 arranged within the tubular element. The mandrel 2 is located inside the drawing die opening so that the tubular element passes between the mandrel 2 and the drawing die 4. The drawing equipment can be cooled by water circulation 12 between its components, as can be seen in FIGS. 1 and 3.

The use of an electromagnetic induction coil for heating of the pipe is advantageous because it allows one to verify homogenous temperature of the pipe during heating and dynamically control the other process parameters for due correction, such as speed of the bench and power of the coil. Furthermore, heating with this coil carried out simultaneously with the drawing step provides higher heating rates than those obtained by other heating means. These high heating rates prevent a possible grain growth, might occur during a conventional heating if the material is exposed for a long time at high temperatures.

Another advantage of heating by induction accomplished in the present invention is that the electromagnetic induction coil is easy to install in the line, and this movable coil eliminates the need for handling hot pipes, which has a direct impact on safety, and also increases the speed of pipe production, because it eliminates the need to transport the pipes from the furnace to the production line. Moreover, heating by induction eliminates the need to burn fuel gas for heating the pipes in furnaces.

After hot-drawing, the pipe can be subjected to at least one step of bending when it is desired to produce a curved pipe with a specific format.

The process according to the invention may further comprise heat treatment steps after the steps of heating and hot drawing, with the purpose of adjusting material properties. These heat treatment steps depend on the mechanical and metallurgical properties of the multilayer pipe 1 that may need adjustment. Some materials may lose some of their mechanical, metallurgical and corrosion properties during the production steps. These additional thermal treatments may, therefore, be performed, in order to restore the mechanical, metallurgical and corrosion properties of the pipe, for example, when the pipes 10 and 20 are made of X65 steel and Inconel®. In preferred embodiments of the invention, in the heat treatment step, the multilayer pipe is subjected to a cooling or a quenching and tempering step, which contributes to adjusting the mechanical, metallurgical and corrosion properties of the pipe.

FIG. 3 schematically shows an embodiment of the invention in which a cooling equipment 8 of the pipes is arranged in series at the output of the drawing die 4. Forms of cooling are determined according to the final parameters of the multilayer pipe to be obtained.

Cooling can be effected, for example, on a bench lined with refractory material, to maintain high temperatures and allow diffusion for a long time, or using industrial fans promoting forced convection cooling to increase the mechanical strength of the outer pipe and avoid restrictions during the process. Cooling may also simply be to the atmospheric air or any other cooling means for adjusting the properties of the material.

A step of cold drawing may also be performed after the hot drawing in order to improve the geometric tolerance and the surface finish. If this cold drawing is performed, a previous lubrication of the inner surface of the inner pipe and the outer surface of the outer pipe may also be carried out. Otherwise, the graphite remaining from the hot drawing steps may serve as lubricant for reducing friction.

Figure 5:
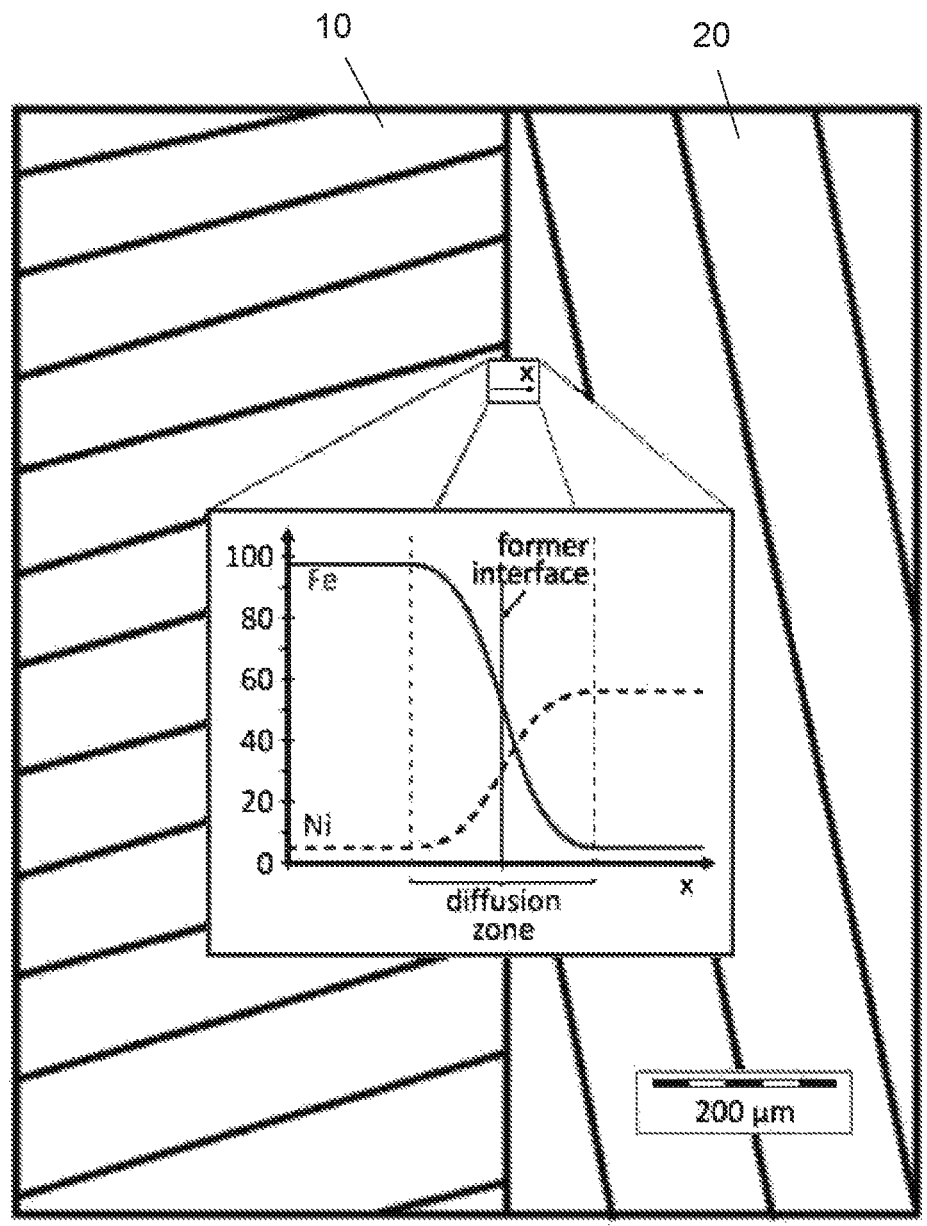
FIG. 5—picture of the interface between the pipes of an embodiment of the drawn multilayer pipe having a metallurgical bond produced by the process of the present invention, associated with a diagram of the concentration of the iron and nickel elements in the interface between the pipes.

Importantly, after the drawing, no additional subsequent rolling steps are required, unlike the prior-art processes. FIG. 5 contains a microscopic cross-sectional picture of the interface of the junction between the multilayer pipes according to an exemplary product of the invention, in the parts of the final multilayer pipe 1 were a metallurgical bonding is formed, wherein the outer pipe 10 is shown on the left side in a darker shade of gray and the inner pipe 20 is shown on the right side in a lighter shade of gray. The interface between the inner pipe and the outer pipe is virtually extinguished, characterizing metallurgical bonding in these parts of the pipe. The interface between the pipes in a section corresponding to the upper smaller box is represented in terms of the concentration of the materials of both pipes in the diagram below it. This diagram is an enlarged version of said interface section, in which the ordinate axis represents the concentration of each element in mass percent and the abscissa represents the position inside the multilayer pipe. As in FIG. 4, this diagram shows the concentration of the elements iron (Fe) and nickel (Ni) in the X direction in the interface region between the pipes in the parts where a metallurgical bonding is formed. The solid line represents the concentration of iron, representing the outer pipe 10, and the dashed line corresponds to the concentration of nickel representing the inner pipe 20 according to one embodiment of the invention. Note that the variation of concentration of iron and nickel is smoother, providing a diffusion zone in which the two mentioned elements and thereby the materials of inner and outer pipes mix. This means that there was metallurgical bonding, that is, cladding between the pipes. A thicker and more homogeneous diffusion zone commonly leads to a better cladding.

Alternatively, after cooling the pipe, a verifying step of the metallurgical bond between the pipes may be performed, for confirmation that cladding occurred. The verification may be destructively by cutting a section of the pipe, for example, at intervals of 90° to verify whether in all of these pieces the outer and inner pipes remain attached. Verification can also be non-destructively, through inspection by Ultrassonic testing, analysis of the microstructure, cross sectional analysis of the interface, SEM/EDX or GDOES testing, among others, to check if a metallurgical clad was obtained at least in a part of the pipe produced by the process according to the invention.

The process according to the present invention has a much higher performance when compared with the processes of the prior art, since it does not require any displacement of the pipe or of the inner and outer pipes within the manufacturing installations other than the drawing equipment itself. And in view of the simplicity of the process and the reduced number of steps, it is possible to produce a high amount of multilayer pipes within a small period, with an estimated productivity higher than 100 m/h.

The present invention also relates to a multilayer pipe having a metallurgical bond produced by the process described herein comprising at least an outer layer formed from the outer pipe 10 that is metallurgically bonded to an inner layer formed from an inner pipe 20 in at least parts of the interface between these two pipes. Alternatively, the multilayer pipe may comprise multiple layers having a metallurgical bond externally and internally to the pipe 10 in at least a part of their surfaces, which are responsible for providing mechanical strength to the final multilayer pipe. These layers are preferably made from seamless pipes arranged externally to the outer pipe 10 and subjected to the hot drawing process described herein. The inner pipe 20 and the outer pipe 10 are preferably seamless, so as to prevent the multilayer pipe produced from having seams on its surface.

The outer pipe 10, which typically provides mechanical strength consists of a carbon manganese steel alloy, and the inner pipe 20 consists of a corrosion-, abrasion- or fatigue-resistant alloy.

According to one embodiment of the invention, the outer pipe 10 may have the following chemical composition:
C≤0.30
Mn≤1.40
P≤0.030
S≤0.030
Cu≤0.5
Cr≤0.5
Ni≤0.5
Mo≤0.15
Nb+V+Ti≤0.15
and the following mechanical properties before and after the process according to the invention (YS=yield strength and UTS=tensile strength):
360 MPa<YS<830 MPa
455 MPa<UTS<935 MPa
minimum elongation $\varepsilon_{min}$=15%.

The corrosive environment for the corrosion-resistant alloy of the inner pipe 20 corresponds to environment levels I-VII of the International Standard NACE MR0175.

As explained above, other pipes of corrosion-resistant alloy (CRA) or abrasion-resistant alloy (WRA) or fatigue-resistant alloy may be applied on the outer pipe, constituting additional outer layers. The inner pipe 20 and/or the pipes used for external cladding may be made of a material comprising at least one of carbon steel, low alloy steel, high alloy steel, stainless steel, nickel base alloy, titanium base alloy, cobalt base alloy, copper base alloy, tin base alloy, zirconium base alloy and Inconel®.

In an alternative embodiment of the invention, the tubular element, before hot drawing, comprises at least one intermediate layer of metallic material on the interface between the outer pipe 10 and the inner pipe 20. This intermediate layer of metallic material may have a melting point lower than the melting point of the metallic materials constituting the outer pipe 10 and the inner pipe 20, but it is not an essential component to ensure metallurgical bonding between the pipes. Thus, in this embodiment of the process with hot drawing, the pipe can be heated to a temperature significantly below the reported range of 950° C. to 1050° C. The intermediate layer of metallic material may also be formed of a material that has affinity with the metallic materials of the outer pipe 10 and inner pipe 20 in order to avoid the formation of deleterious phases that consequently may weaken the interface between materials. The intermediate layer may consist of nickel (Ni), zirconium (Zn) or other metals or metal alloys.

The multilayer pipe produced by this process is a clad pipe, when the bonding between the layers forming the multilayer pipe meets the minimum requirements of norms ASTM A578 and API 5LD as described above. According to the present invention, the clad pipe may achieve up to 100% cladding between the outer pipe 10 and the inner pipe 20.

The dimensions of the multilayer pipe produced by the process of the present invention will depend on the application thereof. According to one embodiment of the present invention, the pipes may have an outer diameter dext varying from 50.80 mm<dext<355.6 mm, and a wall thickness WT varying from 5.0 mm<WT<30.0 mm, wherein the minimum wall thickness of the pipe of the corrosion resistant alloy for linepipe applications is WTmin−CRA=2.50 mm.

The total deformation values of the final pipe when compared to the initially assembled pipes before the production process according to the invention are the following:
Outer diameter deformation: 0.1 to 20%
Wall thickness deformation: 0.1 to 40%
Wall section area deformation: 0.1 to 40%

The example described above represents a preferred embodiment; however, it should be understood that the scope of the present invention encompasses other possible variations, and is limited only by the content of the appended claims, which include all possible equivalents.

What is claimed is:

1. A process for producing a multilayer pipe having a metallurgical bond from a tubular element, comprising:

forming a tubular element by arranging one inner pipe of metallic material within at least one outer pipe and producing a mechanical bond directly between an inner surface of the outer pipe and an outer surface of the inner pipe along substantially an entire interface between the inner and outer pipes to remove oxygen from between the inner and outer pipes;

simultaneously heating and drawing, after producing the mechanical bond, the tubular element from a first diameter to a smaller second diameter to produce a metallurgical bond between the inner surface of the outer pipe and the outer surface of the inner pipe, in a diffusion zone in which the materials of inner and outer pipes mix, wherein each portion of the tubular element is subjected to heating by induction by being pulled through the inside of at least one electromagnetic coil and then subjected to hot drawing, and wherein the tubular element is pulled through a drawing die sequentially arranged at the outlet of the at least one electromagnetic coil, with the mandrel positioned within the tubular element in alignment with a drawing die opening.

2. The process, according to claim 1, wherein the outer pipe comprises a carbon manganese steel alloy and the inner pipe comprises a corrosion-resistant alloy.

3. The process, according to claim 1, wherein each section of the tubular element is heated at a temperature of at least 900° C. when crossing the at least one electromagnetic coil, arranged in a production line.

4. The process, according to claim 1, wherein during the heating and drawing, the tubular element is heated to a temperature between 950° C. to 1050° C.

5. The process, according to claim 1, wherein the drawing comprises decreasing the wall thickness of the tubular element by compression of the tubular element between the drawing die and the mandrel.

6. The process, according to claim 1, wherein after the drawing, the process further comprises at least one thermal treatment, wherein the tubular element is subjected to cooling.

7. The process, according to claim 1, further comprising, after the hot drawing, a subsequent cold drawing with an optional previous lubricating of the inner surface of the inner pipe and of the outer surface of the outer pipe.

8. The process, according to claim 1, further comprising, bending the tubular element after drawing.

9. The process, according to claim 1, wherein the multilayer pipe has an outer diameter deformation of 0.1 to 20%, a wall thickness deformation of 0.1 to 40% and a wall section area deformation of 0.1 to 40% upon producing the multilayer pipe with the metallurgical bond.

* * * * *